United States Patent [19]

Camarda et al.

[11] Patent Number: 4,485,670
[45] Date of Patent: Dec. 4, 1984

[54] HEAT PIPE COOLED PROBE

[75] Inventors: Charles J. Camarda, Newport News; Lana M. Couch, Mathews, both of Va.

[73] Assignee: The United States of America as represented by the Administrator of the National Aeronautics and Space Administration, Washington, D.C.

[21] Appl. No.: 234,222

[22] Filed: Feb. 13, 1981

[51] Int. Cl.³ .............................................. G01L 19/04
[52] U.S. Cl. ...................................... 73/179; 73/708; 165/104.26
[58] Field of Search .................... 73/708; 165/104.26; 374/179, 181, 182

[56] References Cited

U.S. PATENT DOCUMENTS

| 3,229,759 | 1/1966 | Grover | 165/104.26 |
| 3,712,053 | 1/1973 | Kofink | 73/349 |
| 4,014,713 | 1/1977 | Markman et al. | 136/210 |
| 4,067,238 | 1/1978 | Arcella | 73/349 |
| 4,169,387 | 10/1979 | Krempl | 73/708 |

Primary Examiner—Donald O. Woodiel
Attorney, Agent, or Firm—Howard J. Osborn; John R. Manning; Wallace J. Nelson

[57] ABSTRACT

The basic heat pipe principle is employed to provide a self-contained passively cooled probe that may be placed into a high temperature environment. The probe consists of an evaporator region 13 of a heat pipe 10 and a sensing instrument 17. Heat is absorbed as the working fluid 22 evaporates in the probe. The vapor is transported to the vapor space 14 of the condenser region 15. Heat is dissipated from the condenser region and fins 20 causing condensation of the working fluid, which returns to the probe by gravity and the capillary action of the wick 18. Working fluid, wick and condenser configurations and structure materials can be selected to maintain the probe within an acceptable temperature range.

13 Claims, 3 Drawing Figures

HEAT PIPE COOLED PROBE

ORIGIN OF THE INVENTION

The invention described herein was made by employees of the United States Government and may be manufactured or used by or for the Government for governmental purposes without the payment of any royalties thereon or therefor.

BACKGROUND OF THE INVENTION

Presently instrument probes in high temperature environments that are unable to withstand the temperature therein utilize air or water cooled jackets. These active cooling system require costly plumbing and control systems. These systems decrease reliability and require set up and shut down time.

The capability of a heat pipe to passively absorb heat at one location and dissipate it in another is known, U.S. Pat. No. 3,229,759 discloses the capability of heat pipes to conduct and transfer heat at a rate exceeding that of any known metal. Two heat pipes with a common condensor region are effective in controlling the temperature in an environment. By varying the heat input at one end, the condensation available to the end in the monitored environment can be controlled thereby controlling the heat absorption capability. This system lends itself to use as a heat release valve and related applications.

The use of a heat pipe to transfer heat to a heat sensitive mechanical element remote from the heat source has also been disclosed. By selecting a working fluid that evaporates at a desired temperature, and thereby transfers heat by heat pipe operation, a mechanical operation may be controlled by a remote heat source. This principal can be used for thermostats and similar thermo-mechanical devices.

SUMMARY OF THE INVENTION

This invention is a novel utilization of a heat pipe as a passive cooling system for instrument probes in high temperature environments. The support structure for instruments in high temperature environments must be kept within the metal's acceptable temperature range. Heat pipes have a great capability to absorb and dissipate heat. By supporting the instrument in the high temperature environment with the heat absorbing end of the heat pipe, passive cooling of the probe can be accomplished. Heat from the metal support structure is absorbed by the evaporation of a working fluid. The vapor flows to the cool end of the heat pipe, condenses and returns by gravity and capillary action to the support structure to repeat the cycle. Heat can be dissipated by any of several means, for this particular application heat is dissipated by radiation and free-convection from fins attached to the cool end of the heat pipe. The metal, working fluid, capillary wick, and fin size used can be varied to accommodate specific requirements of the particular application and any associated constraints.

It is an object of this invention to provide a support structure for an instrument sensing in a high temperature environment.

Another object of this invention is cooling the support structure of instrument probes in high temperature environments.

A further object is to provide a passive, self-contained cooling system that will overcome the cost and operating deficiencies of the present active cooling systems.

An additional object is to provide a cooling system capable of transferring a great quantity of heat over a small temperature gradient.

Another object of the invention is to provide a heat pipe with a condenser region whose diameter exceeds that of the evaporation region and has fins capable of dissipating large amounts of heat.

A further object is to provide a heat pipe cooling system with a capillary wick and positioned substantially vertical thereby increasing the return flow of working fluid to the evaporator region through the capillary wick and through a capillary artery.

DETAILED DESCRIPTION OF THE INVENTION

Figure 1:
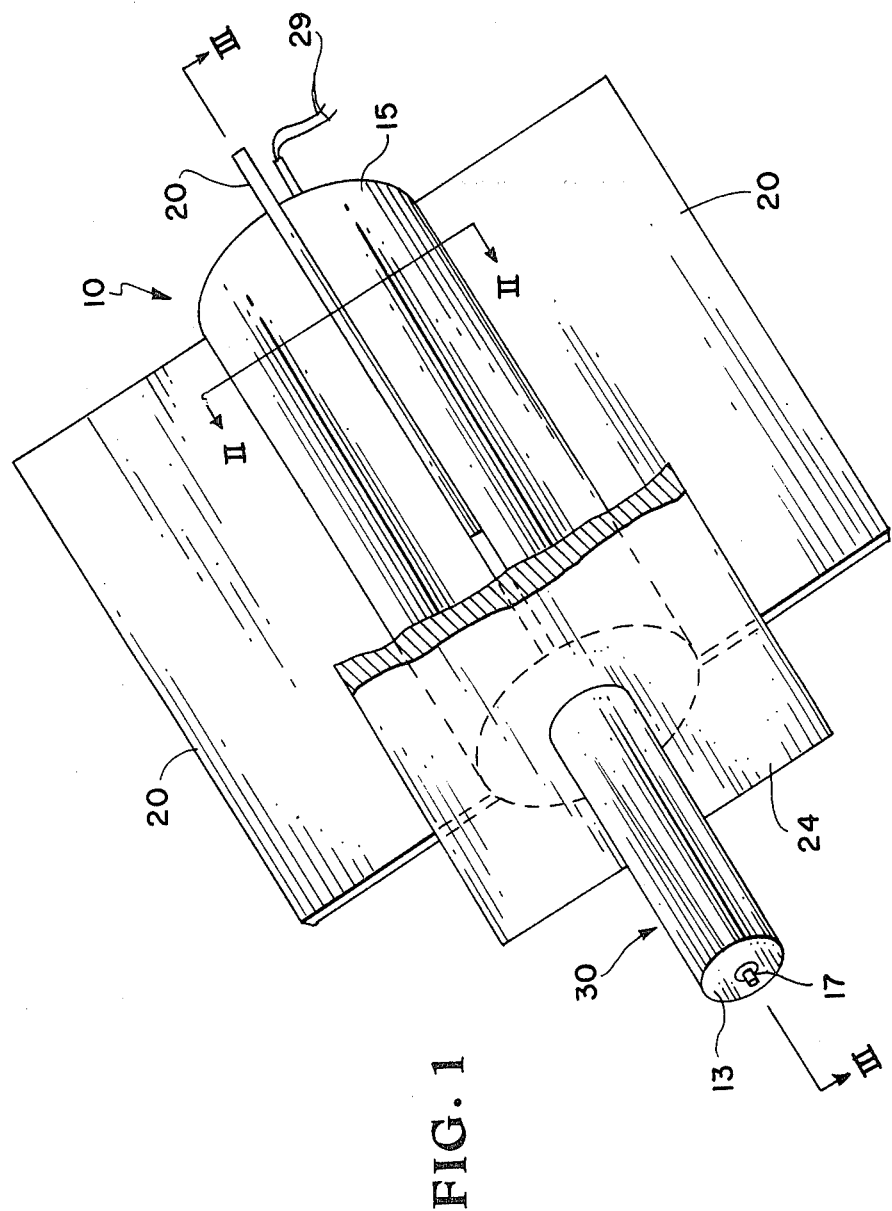
FIG. 1 is a prospective illustration of a novel heat pipe application.

The invention can be best understood by referring to the drawings in which any particular number designates the same element throughout the figures.

Referring to FIG. 1, there is illustrated a heat pipe, designated generally by the reference numeral 10, used to passively cool an instrument probe in a high temperature environment. Numeral 30 designates generally the instrument probe that is inside the wall of the high temperature environment represented by a wall 24. The instrument probe 30 consists of an instrument 17 and support structure 13. Though the invention will cool the support structure of any instrument 17, the form shown utilizes a thermocouple with a cylindrical support structure of Hastelloy X, Td-Ni-Cr or another superalloy capable of withstanding high temperatures.

The instrument probe is designated to operate inside the wall 24 which is a barrier separating the high and low temperature environments. Outside the wall 24 of the high temperature environment is the condenser structure 15 of the heat pipe 10. The condenser structure 15 in the preferred form is cylindrical with a diameter approximately three times that of the support structure 13 to aid in heat dissipation. The metal used in the condenser structure 15 conducts heat radially and fins 20 (FIG. 1) are attached to assist in dissipating heat at the required rate.

The size, shape and material used in the support structure 13, condenser region 15 and fins 20 will vary according to individual design requirements.

Figure 2:
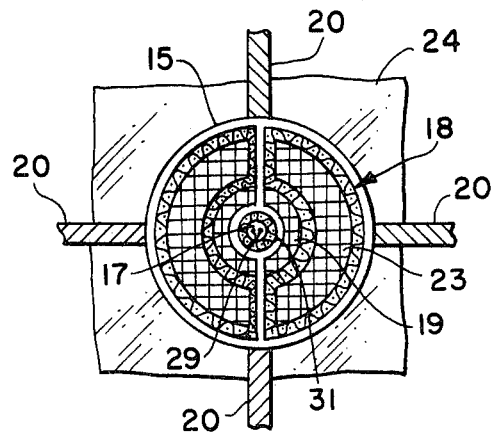
FIG. 2 is a cross-sectional view taken along section lines II—II of FIG. 1.

FIG. 2 illustrates the internal capillary wick, designated generally by the numeral 18, and the internal vapor area 23 of the heat pipe 10. The capillary wick 18 extends from the upper end of the condenser region 14 (FIG. 3) to the evaporator region 22, is necked down and thereafter extends through the evaporator region to the end thereof and the vicinity of the thermocouple 17. The wick is split to form a capillary artery 19 which will allow the condensed liquid to fall directly to the evaporator region 22. In the preferred embodiment the wick consists of a stainless steel screen that engages the support structure wall 13 and a tube 31 (to be explained below) and channels the working fluid between the tube and heat pipe wall. The capillary wick 18 can also be a fibrous material that assists fluid flow.

Figure 3:
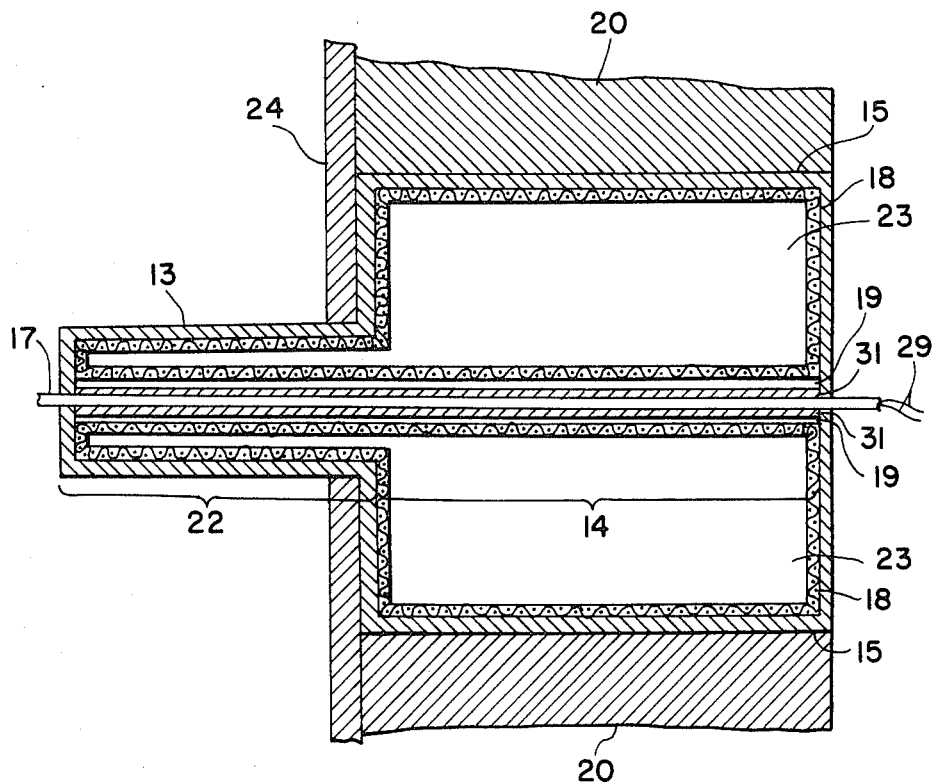
FIG. 3 is a sectional view taken along the lines of III—III of FIG. 1.

Referring now to FIG. 3, there is illustrated a cross-section of the heat pipe 10. The evaporator vapor region 22 extends from the instrument 17 to the wall of the high temperature environment 24 where the condenser region 14 begins. The support structure 13 encases the evaporator region 22 and supports the instrument 17. The condenser structure 15 encases the condenser region 14.

FIG. 13 also illustrates the capillary wick 18 which extends along the inner wall of the condenser structure 15 to the evaporator structure 13. The capillary wick 18 conveys a working fluid which in the preferred embodiment is liquid sodium but will vary according to design requirements. A protective tube 31 covers the instrument 17 electrical leads 29 in the heat pipe 10. In the preferred form the protective tube 31 is a stainless steel tube.

OPERATION OF THE INVENTION

In operation, as the instrument support structure 13 is heated the working fluid in the capillary wick 18 in the evaporator region 22 absorbs heat and vaporizes. The vaporized working fluid in the evaporator region 22 flows to the condenser region 14. Heat is conducted by the condenser structure 15 and dissipated by convection and radiation from the condenser structure 15 and fins 20 causing the vapor to condense. The working fluid returns to the evaporator region 13 via the wick 18 by capillary action and directly via the capillary artery 19. In the preferred embodiment the heat pipe is positioned vertically with the condenser region on top which allows gravity to assist the capillary action and the fluid to flow through capillary artery 19.

In this manner heat can be continuously transferred from the support structure thereby avoiding unacceptably high probe peak temperatures.

What is claimed as new and desired to be secured by Letters Patent of the United States is:

1. A heat pipe cooled probe comprising:
   probe means for sensing in a thermally hostile environment;
   heat pipe means forming a part of said probe means;
   said heat pipe means including first means for absorbing heat in a high temperature area of the probe and conducting it to an area of lower temperature;
   said heat pipe means including second means for dissipating heat from the area of lower temperature; and
   said heat pipe means including capillary artery means for allowing a working fluid to flow directly from said low temperature area to said high temperature area.

2. A device as in claim 1 wherein said probe means for sensing is an instrument for sensing fluid flow conditions.

3. A device as in claim 1 wherein said first means is an evaporator region of said heat pipe means.

4. A device as in claim 3 wherein said first means for absorbing heat from said probe means includes a working fluid in the evaporator region of said heat pipe means.

5. A device as in claim 3 wherein said heat pipe means includes wick means for cycling a working fluid contained therein.

6. A device as in claim 1 wherein said second means is a condenser region of the heat pipe means including fins to assist in heat dissipation.

7. A device as in claim 5 wherein the diameter of the condenser region exceeds that of the evaporator region to increase heat dissipation.

8. A device as in claim 1 wherein said instrument is a temperature sensing instrument.

9. A device as in claim 8 wherein said temperature sensing instrument is a thermocouple.

10. A device as in claim 1 wherein said heat pipe means includes a housing;
    said housing having an evaporator region and a condensing region;
    wick means extending from said evaporator region to said condensing region;
    working fluid means disposed within said housing;
    sensing means carried by said evaporator region;
    capillary artery means for allowing said working fluid to flow directly to said evaporator region; and
    said sensing means being passively cooled by said working fluid being evaporated and operating as a heat sink in said evaporator region, carrying the heat to the condensing region, condensing to give up heat to said means for dissipating heat, and returning via said wick means and said capillary artery means to complete a continuous cycle.

11. A device as in claim 10 positioned substantially vertically over the high temperature environment to allow gravity to assist said heat pipe means fluid flow.

12. A device as in claim 10 wherein said wick means is of a thickness which will prevent boiling of a working fluid carried therein.

13. A device as in claim 1 wherein said instrument is a pressure sensing instrument.

* * * * *